United States Patent Office 2,716,652
Patented Aug. 30, 1955

2,716,652
PRODUCTION OF ISODIBENZANTHRONE

Willy Braun, Heidelberg, and Gerhard Treuge, Ludwigshafen (Rhine-Oppau), Germany, assignors to Badische Anilin- & Soda-Fabrik Aktiengesellschaft, Ludwigshafen am Rhine, Germany No Drawing. Application January 28, 1954,
Serial No. 406,877

Claims priority, application Germany February 3, 1953

2 Claims. (Cl. 260—358)

This invention relates to sulfur containing compounds in particular sulfides of the anthraquinone series and condensation products thereof.

We have found that the known reaction of aromatic halogen compounds, in particular those of the anthraquinone series, with alkali sulfides, if desired in the presence of sulfur, to form compounds containing sulfur, can be carried out in a very simple manner which is extremely advantageous industrially by effecting the reaction in molten salts of carboxylic acids.

As salts of carboxylic acids there may be used the salts, in particular the alkali metal and alkaline earth metal salts, of aliphatic monocarboxylic and polycarboxylic acids, such as formic acid, acetic acid, propionic acid, adipic acid or the higher fatty acids. Salts of aromatic carboxylic acids, such as benzoic acid and phthalic acid, may also be used, in particular in admixture with the abovementioned fatty acids. In addition to the alkali metal or alkaline earth metal salts, the salts of carboxylic acids with organic nitrogen bases, such as triethanolamine, are also eminently suitable. Mixtures of the said salts, as for example mixtures of potassium and sodium acetate or potassium acetate and sodium propionate, or sodium acetate and potassium propionate, and other analogous mixtures, are especially advantageous.

The process may be used for the conversion of practically all aromatic halogen compounds into sulfur containing compounds, although the halogen compounds of the anthraquinone series are especially suitable as initial materials and especially valuable compounds containing sulfur are obtained therefrom.

The reaction temperature may vary within wide limits and is dependent on the reactivity of the reactants; it is generally speaking between 120° and 200° C. Since the speed of the reaction is usually very high, the reactions are as a rule completed after a short time. Since the solvents and diluents used hitherto for such reactions are not necessary, the separation of the products formed is greatly simplified because the salt melts used as the reaction medium in the present case are usually soluble in water so that it is only necessary to dilute the reaction mixture with water or to pour it into water in order to obtain the end product in a readily separable form. This is practically free from impurities so that special purification is usually unnecessary; the most that is needed for the complete removal of the salts originating from the melt is a simple boiling with water or dilute mineral acid.

A further very considerable advantage of the process lies in the fact that the resultant compounds containing sulfur can be further condensed in the same melt and without previous separation with alkaline agents, when their constitution permits such condensation. Thus for example the reaction of Bz-1-bromobenzanthrone with sodium sulfide to form Bz-1.Bz-1'-dibenzanthronyl sulfide can be directly combined, without separating the latter, with a treatment with an alkali hydroxide leading to isodibenzanthrone. Contrasted with the known alcoholic potash fusion, the use of alcohols is unnecessary. Moreover the new process requires less alkali hydroxide than the usual alcoholic potash fusion. This combination of two reactions into one renders possible a very considerable saving in labour and time, requires less chemicals and energy and yields the end product in a very good yield and high purity.

The following examples will further illustrate this invention but the invention is not restricted to these examples. The parts are parts by weight.

Example 1

8.5 parts of 67% sodium sulfide, 1 part of sulfur powder and 25 parts of Bz-1-chlorobenzanthrone are introduced while stirring at 140° to 145° C. into a melt of 70 parts of potassium acetate and 83 parts of crystallized sodium acetate, and the mixture is stirred at 140° to 145° C. for a further 4 to 5 hours. The melt is then diluted with water and the precipitate which separates is filtered off by suction, washed with water until neutral and dried. Bz-1.Bz-1'-dibenzanthrone sulfide is thus obtained in a yield of 98% of the calculated amount.

Example 2

Into a melt of 70 parts of potassium acetate and 83 parts of crystallized sodium acetate there are introduced, while stirring at 140° to 145° C., 10 parts of 67% sodium sulfide, 1 part of sulfur and 25 parts of Bz-1-bromobenzanthrone and the mixture is stirred for 5 hours at 140° to 145° C. and 3 hours at 155° to 160° C. 30 parts of ground potassium hydroxide are then added and the whole further stirred at 210° to 215° C. until a sample of the melt is completely vattable. The melt is then poured into water, the aqueous suspension blown with air, the deposited dyestuff filtered off by suction and washed until neutral. Isodibenzanthrone is thus obtained in a yield of 92.5% of the calculated amount.

Instead of a mixture of potassium acetate and sodium acetate there may be used with a similar result potassium acetate or sodium acetate alone.

Example 3

6.6 parts of 67% sodium sulfide and 25 quarts of 1-chloranthraquinone are introduced into a melt of 70 parts of potassium acetate and 83 parts of crystallized sodium acetate while stirring at 140° to 145° C., and the mixture is then further stirred at the said temperature until the reaction is completed, which is usually the case after 2 hours. The melt is poured into water, the separated 1.1'-dianthraquinonyl sulfide is filtered off by suction, washed with water and a little methanol and dried. The yield is about 89% of the calculated amount. After boiling with glacial acetic acid and recrystallization from nitrobenzene, 1.1'-dianthraquinonyl sulfide is obtained therefrom in the form of orange-red crystals of the melting point 315° to 316° C.

Example 4

12.8 parts of 67% sodium sulfide and 25.7 parts of 1-chlor-2-methylanthraquinone are introduced into a melt of 70 parts of potassium acetate and 83 parts of crystallized sodium acetate at 120° to 125° C. while stirring and the mixture is further stirred for 1 hour at 120° to 125° C. and for 2 hours at 140° to 145° C. After the usual working up, 2.2'-dimethyl-1.1'-dianthraquinonyl sulfide is obtained in a yield of 80 to 85% of the calculated amount.

Example 5

3 parts of sodium sulfide and 25 parts of 1-chlor-4-benzoylaminoanthraquinone are introduced into a melt of 70 parts of potassium acetate and 83 parts of crystallized sodium acetate at 160° to 165° C. while stirring and the mixture is further stirred at the said temperature until chlorine is no longer detectable in the reaction product formed. After the usual working up of the reaction mixture, 20.5 parts (87% of the calculated amount) of 4.4′-dibenzoylamino-1.1′-dianthraquinonyl sulfide is obtained; it crystallizes in dark red prisms from nitrobenzene.

*Example 6*

5.2 parts of 67% sodium sulfide and 25 parts of 1-amino-2-bromoanthraquinone are introduced at 140° to 145° C. while stirring into a melt of 70 parts of potassium acetate and 83 parts of crystallized sodium acetate and the mixture is further stirred for 4 hours at 140° to 145° C. and for 2 hours at 150° to 155° C. After working up as described in Example 1, a yield of 96% of the calculated amount of 1.1′-diamino-2.2′-dianthraquinonyl sulfide is obtained. It can be purified by boiling up with glacial acetic acid.

What we claim is:

1. An improved process for the production of isodibenzanthrone which comprises heating a mixture of Bz-1-bromobenzanthrone and sodium sulfide in the presence of a small amount of sulfur in a melt of an alkali metal acetate selected from the class consisting of sodium acetate, potassium acetate and a mixture thereof, at about from 140° to 160° C. to produce Bz-1.-Bz-1′-dibenzanthronyl sulfide, adding a member of the class consisting of sodium hydroxide, potassium hydroxide and mixtures thereof to the resulting mixture, and heating at about 210° to 215° C.

2. An improved process for the production of isodibenzanthrone which comprises heating a mixture of an alkali metal sulfide and a member of the group consisting of Bz-1-chlorobenzanthrone and Bz-1-bromobenzanthrone in the presence of a small amount of sulfur in a melt of an alkali metal acetate selected from the class consisting of sodium acetate, potassium acetate and a mixture thereof, at about from 140° to 160° C. to produce Bz-1.Bz-1′-dibenzanthronyl sulfide, adding a member of the class consisting of sodium hydroxide, potassium hydroxide and mixtures thereof to the resulting mixture, and heating at about 210° to 215° C.

References Cited in the file of this patent

UNITED STATES PATENTS

| Number | Name | Date |
|---|---|---|
| 1,712,646 | Brunsdorf | May 14, 1929 |
| 1,924,456 | Perkins | Aug. 29, 1933 |
| 1,954,482 | Knowles | Apr. 10, 1934 |
| 2,153,312 | Perkins | Apr. 4, 1939 |
| 2,468,606 | Scalero et al. | Apr. 26, 1949 |